United States Patent
Sano

(10) Patent No.: US 11,200,652 B2
(45) Date of Patent: Dec. 14, 2021

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Shinji Sano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 16/596,105

(22) Filed: Oct. 8, 2019

(65) Prior Publication Data
US 2020/0126200 A1 Apr. 23, 2020

(30) Foreign Application Priority Data
Oct. 19, 2018 (JP) .............................. JP2018-197086

(51) Int. Cl.
| | | |
|---|---|---|
| G06T 5/50 | (2006.01) | |
| G06T 7/90 | (2017.01) | |
| G06T 11/00 | (2006.01) | |
| H04N 1/409 | (2006.01) | |
| H04N 1/58 | (2006.01) | |

(52) U.S. Cl.
CPC .................. G06T 5/50 (2013.01); G06T 7/90 (2017.01); G06T 11/001 (2013.01); H04N 1/4092 (2013.01); H04N 1/58 (2013.01); G06T 2207/20192 (2013.01); G06T 2207/20216 (2013.01); G06T 2207/30176 (2013.01)

(58) Field of Classification Search
CPC . G06T 5/50; G06T 7/90; G06T 11/001; G06T 2207/30176; G06T 2207/20216; G06T 2207/20192; G06T 2207/10008; G06T 2207/10024; G06T 5/003; H04N 1/4092; H04N 1/58
See application file for complete search history.

(56) References Cited

U.S. PATENT DOCUMENTS 5,313,313 A * 5/1994 Sato .......................... H04N 1/58
358/514
5,587,814 A * 12/1996 Mihara ................ H04N 5/3692
358/512
(Continued)

FOREIGN PATENT DOCUMENTS

JP 2011-259427 A 12/2011
JP 2017-208602 A 11/2017

*Primary Examiner* — Phuoc Tran
(74) *Attorney, Agent, or Firm* — Canon U.S.A., Inc. IP Division

(57) ABSTRACT

An image processing apparatus processes image data generated by a reading unit configured to read a document, using at least one of a plurality of types of reading elements that have different spectral sensitivity characteristics and are cyclically arrayed in a first direction, by scanning the document in a second direction vertical to the first direction. The image processing apparatus includes a processing unit configured to perform, on the image data, filter processing for averaging pixel values of pixels at least equal in number to the types of the reading elements in the first direction, wherein the processing unit is implemented by at least one processor or at least one circuit.

7 Claims, 8 Drawing Sheets

(56) References Cited

U.S. PATENT DOCUMENTS

| | | | |
|---|---|---|---|
| 2008/0315071 A1* | 12/2008 | Kubo | H04N 1/40056 |
| | | | 250/208.1 |
| 2014/0029074 A1* | 1/2014 | Tanaka | H04N 1/6086 |
| | | | 358/518 |
| 2017/0006185 A1* | 1/2017 | Yanai | H04N 1/00037 |

* cited by examiner

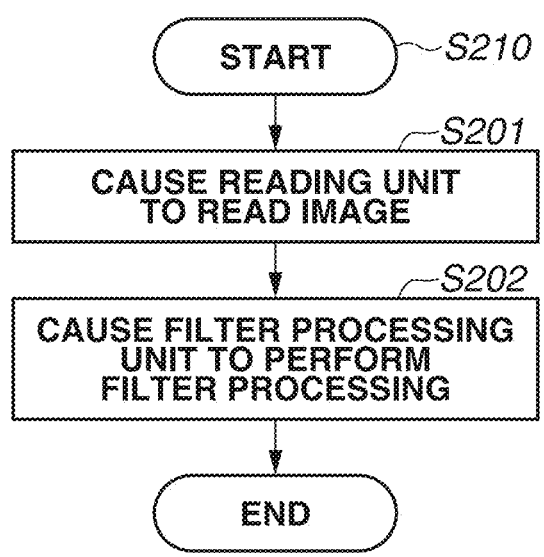
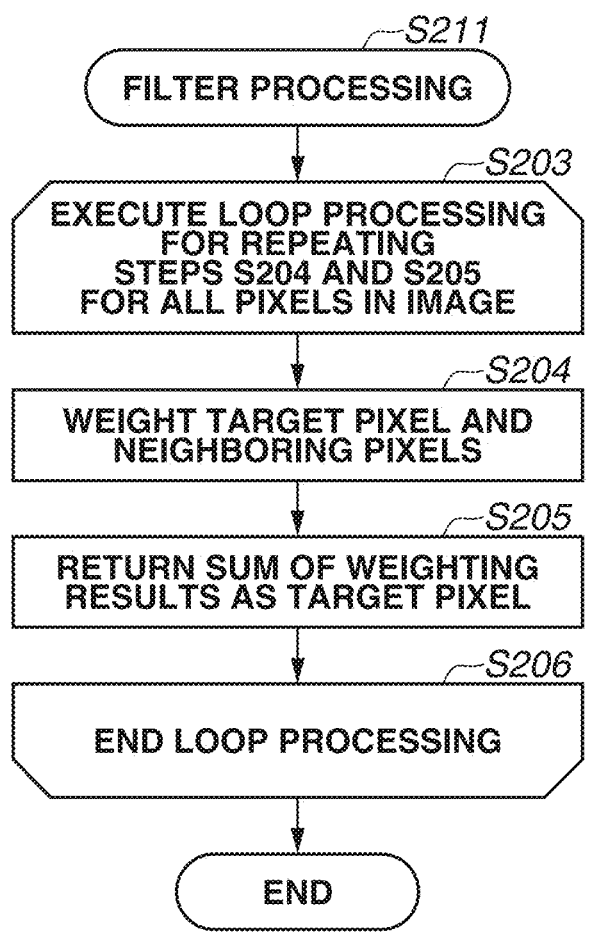

FIG.5
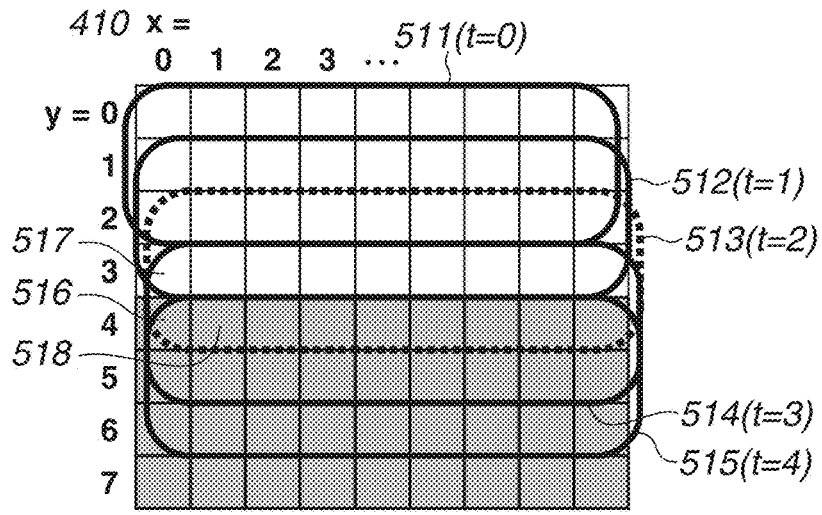
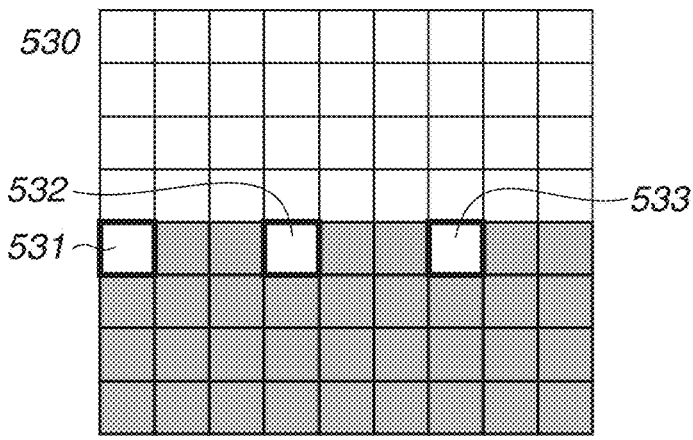

FIG.7

FIG.8
(PRIOR ART)
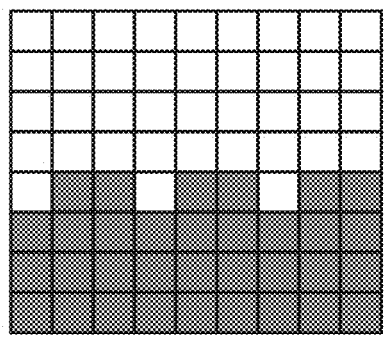
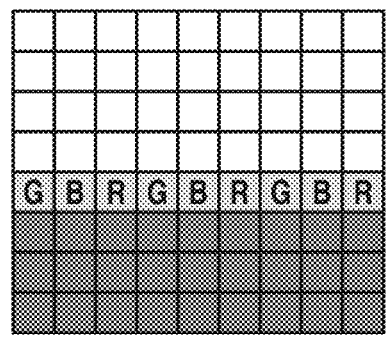

IMAGE PROCESSING APPARATUS, CONTROL METHOD FOR IMAGE PROCESSING APPARATUS, AND STORAGE MEDIUM

BACKGROUND

Field

The present disclosure relates to an image processing apparatus that processes image data read from an original document, a control method for an image processing apparatus, and a storage medium.

Description of the Related Art

A copier and a multifunction printer includes an image reader for reading an image from an original document. Examples of a conventionally known image reader include one that includes a contact image sensor (CIS) that directly reads an image using a linear sensor via a Selfoc (registered trademark) lens.

Among such image readers, a type widely in use has a configuration in which a plurality of linear sensors having respective lengths thereof extending in a certain direction are arranged side by side in parallel, so that such a type of image reader reads an original document by these linear sensors physically scanning the original document in a direction perpendicular to the lengths of the linear sensors. Within each of the linear sensors, a plurality of photosensitive elements (light receiving elements) that have the same spectral sensitivity are arrayed. The plurality of linear sensors intended to read different colors such as red, green, and blue is configured to include corresponding color filters applied over light receiving surfaces. The sensors consequently have respectively different spectral sensitivities. An image is read by each of the linear sensors, and photoelectrically converted into signals. Signal values thus obtained are combined with coordinates at which the image has been read, and then read-image data is generated. In the combining process, the signal values of the sensors having different spectral sensitivities are treated as signal values that correspond to one set of coordinates. Thus, color image data can be generated.

There is also known a type of image reader in which, instead of a plurality of line sensors each having the spectral sensitivity for the same color arranged side by side in parallel, a plurality of line sensors in each of which photosensitive elements having different spectral sensitivities are arrayed are arranged side by side in parallel. Such an image reader reads an image by causing these line sensors to scan the image.

Yet another known type of image reader includes, instead of line sensors, an area sensor (for example, a charge-coupled device (CCD) image sensor with the Bayer pattern) in which photosensitive elements having different spectral sensitivities are two-dimensionally arrayed. Such an image reader reads an image by causing the area sensor to scan the image.

In such an image reader, instead of a monochromatic line sensor in which photosensitive elements having the same spectral characteristic are arrayed in the direction vertical to the sensor scanning direction, photosensitive elements having different spectral characteristics are arrayed in a specific pattern, which enables reading with even higher density, speed, and accuracy.

However, deterioration in image quality may occur in edge portions of an object such as a character or a line on an original document due to an optical error of the sensor and an error in driving of the sensor for scanning during image reading, or shaking of the image reader caused by an external factor.

FIG. 8 illustrates examples of deterioration in image quality (cyclic unevenness and color shift).

In FIG. 8, image data 800 illustrates deterioration in image quality that occurs in an edge portion of a monochrome line when a monochrome gray image is generated by reading using only a sensor for green among those for red, green, and blue. In this example, the edge portion of the monochrome line is not uniformly aligned, and cyclic unevenness (irregularities) occur.

Image data 801 illustrates deterioration in image quality that occurs in an edge portion of a monochrome line when a color image is generated by reading using sensors for three colors of red, green, and blue. In this example, the red, green, and blue colors are not uniformly distributed in the edge portion of the monochrome line, and a color shift cyclically occurs.

Furthermore, the occurrence of such a color shift not only causes deterioration in image quality but also raises another issue. Some image readers employ an image processing technique called Auto Color Select (ACS). This technique determines whether an original document read by the image reader is printed in color or only in monochrome. This ACS, however, may determine an area in which the color shift has occurred as a continuous area composed of color pixels and thus erroneously determine a monochrome original document as a color document.

Techniques for overcoming these issues include a technique for correcting the color shift after determining whether correction needs to be performed on the read image (Japanese Patent Application Laid-Open No. 2017-208602) and a technique in the ACS is executed after correcting the color shift (Japanese Patent Application Laid-Open No. 2011-259427).

If a position and an amount of deterioration in image quality, typically caused by the occurrence of cyclic unevenness and color shift as in the above-described examples, have been identified in advance as known characteristics of an image reader, the ACS can be correctly performed by correcting the deterioration in image quality and/or excluding the identified position from positions used for ACS determination.

SUMMARY

It has now been determined that causes of deterioration in image quality include not only reproducible causes resulting from known factors but also causes resulting from shaking of an image reader due to an external factor and unreproducible shaking due to an original document or driving of a sensor. Deterioration in image quality due to such unexpected causes cannot be improved by conventional techniques.

In conventional techniques, if a position and an amount of deterioration in image quality can be determined from read image data, the ACS can be correctly performed by correcting the deterioration in image quality and/or by excluding the determined position from positions used as references for ACS determination. However, it is difficult to make a distinction between a content originally contained in an original document and a phenomenon generated as a result of deterioration in age quality. Therefore, a correct content of the original document may be corrected excessively as a result of erroneous determination.

As described above, the conventional techniques have an issue that, on such a read image that has been deteriorated in its image quality, correction that is effective in improving the image quality or accurate ACS may not be executed.

Based on the above-discussed considerations, in accordance with an aspect of the present disclosure, an image processing apparatus processes image data generated by a reading unit configured to read a document, using at least one of a plurality of types of reading elements that have different spectral sensitivity characteristics and are cyclically arrayed in a first direction, by scanning the document in a second direction vertical to the first direction. The image processing apparatus includes a processing unit configured to perform, on the image data, filter processing for averaging pixel values of pixels at least equal in number to the types of the reading elements in the first direction, wherein the processing unit is implemented by at least one processor or at least one circuit.

Further features of the present disclosure will become apparent from the following description of exemplary embodiments with reference to the attached drawings.

BRIEF DESCRIPTION OF THE DRAWINGS

FIGS. 2A and 2B are flowcharts illustrating an example of operation of the image processing apparatus according to an exemplary embodiment.

FIG. 5 illustrates reading on a monochrome gray image in which cyclic unevenness has occurred.

FIG. 7 illustrates an image in which a color shift has occurred and effects of filter processing according to a third exemplary embodiment.

FIG. 8 illustrates examples of deterioration in image quality (cyclic unevenness and a color shift).

DESCRIPTION OF THE EMBODIMENTS

Figure 1:
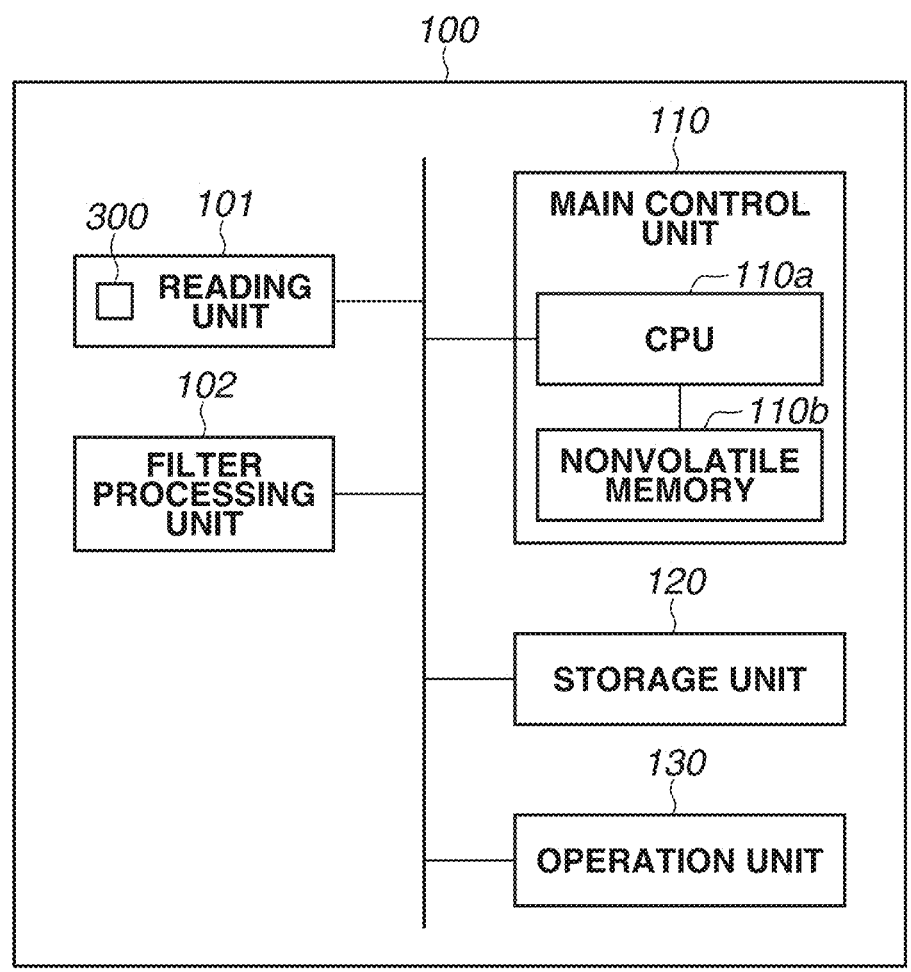
FIG. 1 is a diagram illustrating an example of the configuration of an image processing apparatus according to an exemplary embodiment.

Exemplary embodiments for carrying out the aspects of the present disclosure are described below with reference to the accompanying drawings. Configurations provided in the following exemplary embodiments are merely examples, and the scope of the present disclosure shall not be limited to configurations illustrated in the drawings.

A first exemplary embodiment is described below. The present exemplary embodiment will be described using an example of a configuration in which a gray image of 600 dpi is generated using only photosensitive elements (light receiving elements or reading elements) having the same specific spectral characteristic in a sensor that includes photosensitive elements having different spectral sensitivity characteristics arrayed in specific patterns. An alternative configuration for generating a gray image may be employed in which the gray image is generated by blending colors after color images are generated. However, the configuration according to the present exemplary embodiment is characterized by generating a gray image in a simpler manner and at higher speed than the alternative configuration in which colors are blended.

FIG. 1 is a diagram illustrating an example of the configuration of an image processing apparatus according to an exemplary embodiment of the present disclosure. In the configuration of the image processing apparatus according to the present exemplary embodiment, after a monochrome gray image is generating by reading an original document, improvement processing for improving image quality is executed on the generated image.

As illustrated in FIG. 1, an image processing apparatus 100 according to the present exemplary embodiment includes a main control unit 110, a storage unit 120, an operation unit 130, a reading unit 101, and a filter processing unit 102.

The main control unit 110 controls the entirety of the image processing apparatus 100. The main control unit 110 is, for example, a controller and includes a central processing unit (CPU) 110a and a nonvolatile memory 110b. The CPU 110a implements various kinds of control by executing computer programs stored in the nonvolatile memory 110b.

The storage unit 120 stores therein image data, information associated with the image data, and the like. The storage unit 120 is, for example, configured of a dynamic random access memory (DRAM).

The operation unit 130 receives instructions from an operator and displays information for the operator. The operation unit 130 is, for example, an operation touch panel user interface.

The reading unit 101 includes a sensor 300 illustrated in FIG. 3, which will be described below. The reading unit 101 reads an original document using the sensor 300 to generate image data.

The filter processing unit 102 performs filter processing on an image. The filter processing will be described below.

FIGS. 2A and 2B are flowcharts illustrating examples of operations of the image processing apparatus 100 according to the present exemplary embodiment. FIG. 2A illustrates the overall operation in the present exemplary embodiment. FIG. 2B illustrates details of the filter processing in the present exemplary embodiment. The processing in each of the flowcharts illustrated in FIGS. 2A and 2B is implemented by the CPU 110a in the main control unit 110 when the CPU 110a reads a program stored in the nonvolatile memory 110b and executes the read program. The processing in FIG. 2A is started by the main control unit 110 upon receiving, via the operation unit 130, an operation performed by the operator to start reading.

In step S201, under the control of the main control unit 110, the reading unit 101 reads an original document to generate image data, and stores the generated image data in the storage unit 120. In the subsequent processing, this image data serves as target data on which image processing is performed.

The configuration of the sensor 300 in the reading unit 101 will be described.

Figure 3:
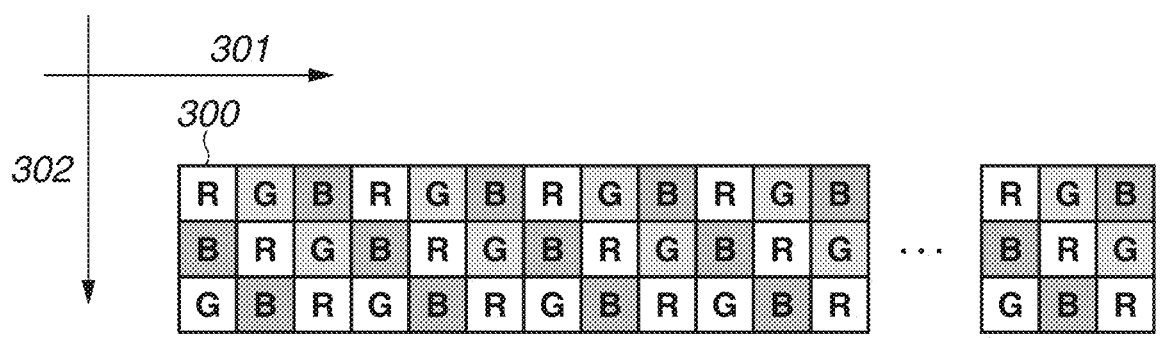
FIG. 3 schematically illustrates a sensor in a reading unit.

FIG. 3 schematically illustrates the sensor 300 in the reading unit 101.

In FIG. 3, a direction 302 is a direction (scanning direction) in which the sensor 300 performs scanning. A direction 301 is a direction vertical to the direction 302.

In the sensor 300, photosensitive elements that acquire red, green, and blue luminance signals are arrayed in specific patterns in the respective directions 302 and 301.

In other words, in the direction 301, the photosensitive elements are arrayed in order of red, green, and blue in a repetitive manner.

In the direction 302, three photosensitive elements are arrayed in order of red, blue, and green, order of green, red, and blue, or order of blue, green, and red. That is, in the sensor 300, the photosensitive elements are arrayed in the direction 302 in a repetitive manner in the minimum unit of three photosensitive elements. In the present exemplary embodiment, the sensor 300 thus configured is used to read a document using only the green photosensitive elements.

That is, the reading unit 101 includes the sensor 300 in which a plurality of kinds of reading elements (photosensitive elements for red, green, and blue) that have different spectral sensitivity characteristics are cyclically arrayed in the direction 301. The reading unit 101 reads an original document by scanning the original document in the direction 302 using at least one (green in the above-described example) of the plurality of kinds of photosensitive elements and generates image data.

First, ideal image reading will be described.

Figure 4:
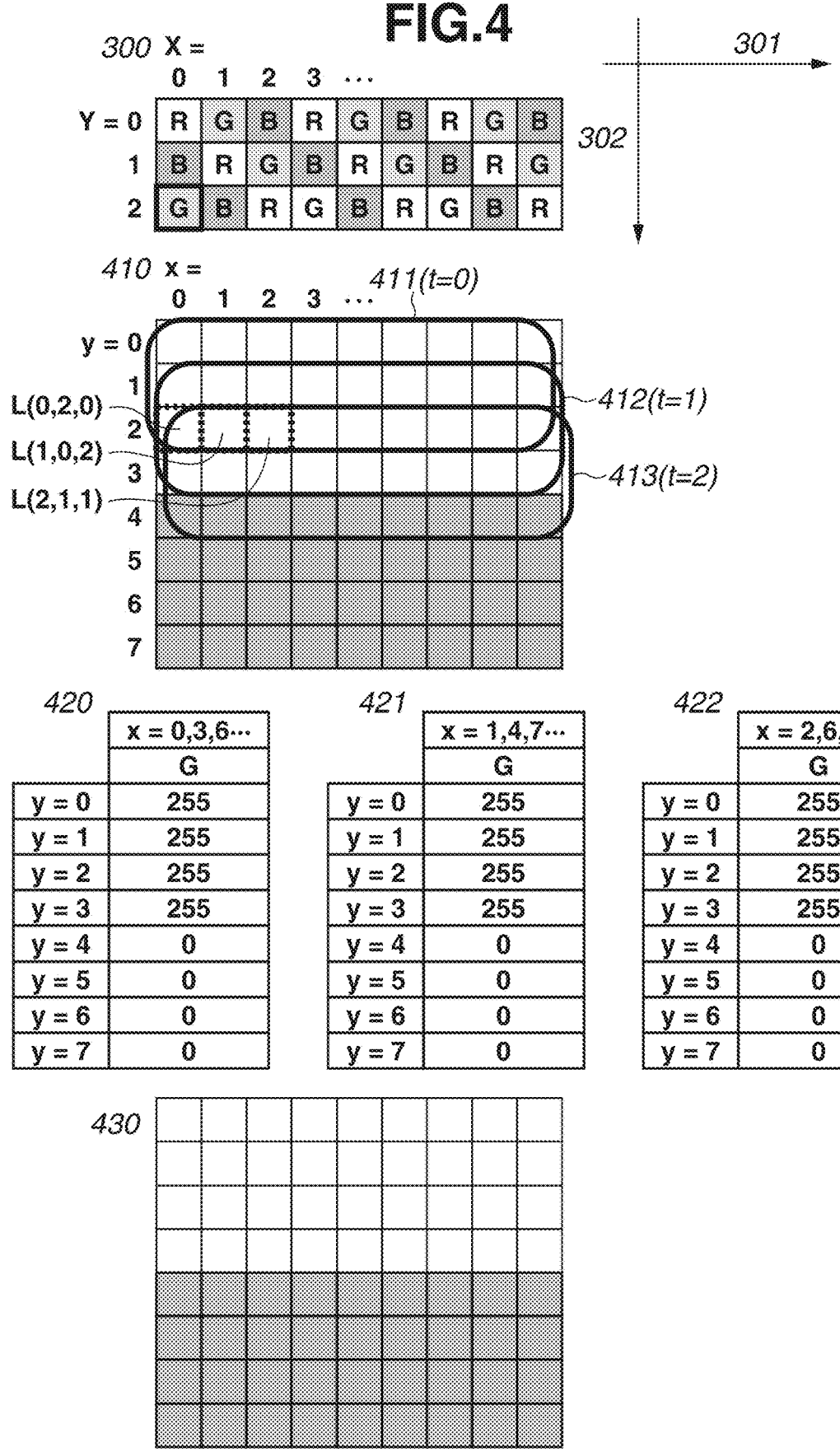
FIG. 4 illustrates ideal image reading.

FIG. 4 illustrates ideal image reading. FIG. 4 illustrates reading of a monochrome gray image in an ideal state, that is, in a state where no deterioration in image quality has occurred. The identical reference numerals are assigned to components that are identical to those in FIG. 3.

An original document 410 has an image printed thereon that has a black object on a white background.

When the image is read with the sensor 300 scanning the original document 410 in the direction 302, for example, luminance signals of 8 bits as indicated in tables 420, 421, and 422 are acquired. The table 420 of luminance signals is generated using the fact that respective sets of acquisition coordinates (x, y) of the green photosensitive elements arrayed in the sensor 300 are different from one another at an acquisition time t.

For example, sensor positions 411, 412, and 413 are defined as positions of the sensor 300 at times t=0, 1, and 2, respectively. A luminance signal value acquired at the time t by the sensor 300 at the sensor position expressed by coordinates (X, Y) is defined as a luminance signal value L(X, Y, t). Accordingly, a green signal value corresponding to coordinates (x, y)=(0, 2) on the original document 410 is acquired as a luminance signal value L(0, 2, 0) (corresponding to a value for y=2 in the table 420). Similarly, a green signal value corresponding to coordinates (x, y)=(1, 2) on the original document 410 is acquired as a luminance signal value L(1, 0, 2) (corresponding to a value for y=2 in the table 421). A green signal value corresponding to coordinates (x, y)=(2, 2) is acquired as L(2, 1, 1) (corresponding to a value for y=2 in the table 422). Green signals for the respective pixels are reconstructed, so that image data 430 of FIG. 4 is obtained as digital image data into which the original document 410 has been correctly reproduced.

Next, a case of image reading in which deterioration in image quality has occurred will be described.

FIG. 5 illustrates reading of a monochrome gray image in which cyclic unevenness has occurred. The identical reference numerals are assigned to components identical to those in FIGS. 3 and 4.

As described in FIG. 4, the original document 410 has an image printed thereon that has a black object on a white background.

When the image is read by the sensor 300 scanning the original document 410 in the direction 302, for example, luminance signals of 8 bits as illustrated in tables 520, 521, and 523 are acquired.

Sensor positions 511, 512, 513, 514, and 515 are defined as ideal sensor positions at times t=0, 1, 2, 3, and 4, respectively.

Here, it is assumed that, at the time t=2, the sensor 300 that is supposed to be at the sensor position 513 is shifted upward in the direction 302 to a position the same as the sensor position 512 at the time t=1. At this time, in a column for x=0, the photosensitive element for green in the sensor 300 reads a signal value (255) at a white pixel 517, i.e., at coordinates (x, y)=(0, 3) although the green photosensitive element is supposed to read a signal value (0) at a black pixel 516, i.e., at coordinates (x, y)=(0, 4).

For example, in a column for x=1, the sensor 300 reads a signal value (0) at a black pixel 518, i.e., at coordinates (x, y)=(1, 4), at the time (t=4) when the sensor 300 is correctly positioned at a position 515.

As a result, as compared with the table 521 where the x-coordinate value is one (x=1) and the table 522 where the x-coordinate value is two (x=2), the luminance signal of the sensor 300 obtained when the x-coordinate value is zero (x=0) extends downward by one pixel in the direction 302 as in the table 520. That is, unevenness (deterioration in image quality) occurs in three-pixel cycles at an edge portion of the black object on the original document 410. Digital image data acquired under such a condition is image data 530 of FIG. 5.

Pixels at the coordinates (x, y)=(0, 4) in the table 520, the coordinates (x, y)=(3, 4) in the table 521, and the coordinates (x, y)=(6, 4) in the table 522, respectively, correspond to pixels 531, 532, and 533 in the digital image data 530 of FIG. 5. In other words, from the case illustrated in FIG. 5, it can be understood that unevenness has occurred in three-pixel cycles at the edge portion.

For the sake of simplified explanation, a case in which an image containing only black pixels and white pixels is read without any blurring has been described with reference to FIG. 5. The amount of the shift of the sensor position that can cause deterioration in image quality has been described to be exactly one pixel in the foregoing case. The period for which the shift of the sensor position occurs is also limited to a certain one-frame period.

In reality, however, blurring due to printing characteristics depending on an original document and/or blurring due to characteristics associated with an optical system in the reading unit exit at the edge portion, i.e., the boundary between the black pixels and white pixels. The amount of the shift of the sensor position is not necessarily limited to exactly one pixel and may exceed one pixel or be less than one pixel. Furthermore, the period for which the shift of the sensor position occurs is not necessarily limited to a one-frame period, and the shift of the sensor position occurs over a plurality of frames in most cases.

Figure 6:
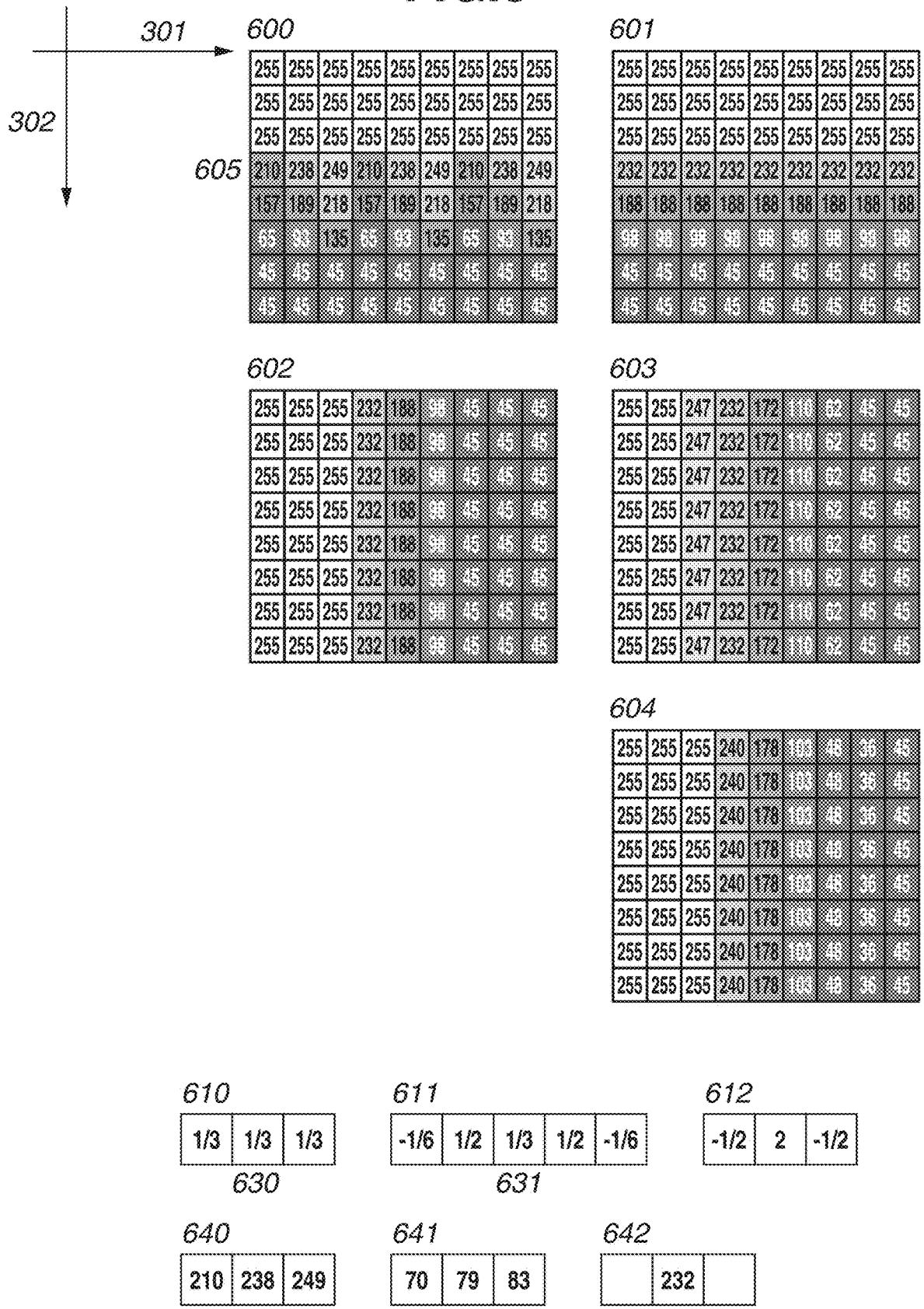
FIG. 6 illustrates an image in which deterioration in image quality has occurred and effects of filter processing.

Image data that has been obtained by reading the original document 410 in such a case and in which deterioration in image quality has occurred as a result is illustrated as image data 600 in FIG. 6.

FIG. 6 is a diagram illustrating image data in which deterioration in image quality has occurred and effects of filter processing. The identical reference numerals are assigned to components that are identical to those in FIG. 5.

In FIG. 6, the image data 600 is image data generated by reading the original document 410 under a condition where such deterioration in image quality may occur. Numerical values provided in respective pixels in the image data 600 indicate luminance signals of 8 bits. The higher numerical value represents a whiter pixel, whereas the lower numerical value represents a blacker pixel. That is, focusing on the sensor scanning direction 302 in the image data 600, it can be understood that blurring of about 3 pixels has occurred due to the printing quality of the original document and the accuracy of the read sensor. In the direction 301 vertical to the direction 302 in the image data 600, meanwhile, it can be understood that shading has occurred in three-pixel cycles as a result of a positional shift of the sensor.

The description returns to the flowchart in FIG. 2A.

Upon completion of the processing in step S201, the processing proceeds to step S202.

In step S202, under the control of the main control unit 110, the filter processing unit 102 performs filter processing by performing convolution on image data. Details of the filter processing is illustrated in FIG. 2B.

In processing of steps S203 to S206 in FIG. 2B, the main control unit 110 performs control such that the processing in steps S204 and S205 is repeatedly performed on all the pixels of the image read in step S201.

In step S204, under the control of the main control unit 110, the filter processing unit 102 weights on a target pixel and neighboring pixels on the right and left of the target pixel. Filter coefficients are illustrated in 1×3 filter coefficient matrix 610 in FIG. 6. The filter coefficients in the filter coefficient matrix 610 are the filter coefficients of a filter for averaging a target pixel 630 and neighboring pixels on the right and left of the target pixel by equally weighting the three pixels. In other words, the filter coefficient matrix 610 is used to average pixels at least equal in number to the types of photosensitive elements in the vertical direction 301 in the image data generated by the reading unit 101. In this case, three pixel values are averaged because three types of the photosensitive elements, i.e., red, green, and blue photosensitive elements, are used. The filter processing unit 102 performs processing in step S204 using the filter coefficient matrix 610.

Image data 640 is a part 605 cut out from the image data 600. When the filter coefficient matrix 610 is applied to perform weighting on an image that has the pixel values as illustrated in the image data 640, image data 641 is obtained as a result.

Subsequently, in step S205, under the control of the main control unit 110, the filter processing unit 102 sums up the target pixel and neighboring pixels on the right and left sides thereof (i.e., values obtained as the results of the weighting in step S205) and determines the resultant value as a pixel value of the target pixel. The result value obtained by performing the summation on the image data 641 is a target pixel 642.

Upon completion of the processing in step S205, the main control unit 110 performs control such that the processing in steps S204 and S205 is repeatedly performed on the subsequent pixels. Upon completion of the processing on all the pixels in the image data 600, the filter processing in FIG. 2B (step S202 in FIG. 2A) is ended.

A result obtained by convolutionally applying the filter coefficient matrix 610 to the image data 600 is image data 601. In the image data 601, the unevenness that appears in three-pixel cycles in the image data 600 is improved and smoothed by the averaging processing.

Upon completion of the processing in step S202, the processing in FIG. 2A is ended.

The operation in the present exemplary embodiment has been described above.

As described above, according to the present exemplary embodiment, unevenness (deterioration in image quality) that occurs in three-pixel cycles can be improved by the filter processing that includes averaging pixel values. Since the cycle depends on the array pattern of the photosensitive elements, it is not limited to the three-pixel cycle. In a case where the cycle has a length of two pixels or four or more pixels, the same effect can be obtained by averaging based on the length. Thus, the image quality of image data read by scanning by a sensor that includes photosensitive elements having respectively different spectral characteristics arrayed in a specific pattern can be improved by a simple configuration. In particular, deterioration in image quality in edge portions can be prevented.

A second exemplary embodiment will be described below. In the first exemplary embodiment described above, image data on which the filter processing is performed contains not only a horizontal line edge as illustrated in the image data 600 in FIG. 6 but also a vertical line edge as illustrated in image data 602 in FIG. 6. When the filter processing is performed on this image data 602 using the filter coefficient matrix 610, image data 603 illustrated in FIG. 6 is obtained. In the image data 603, as compared with the image data 602, the vertical line edge is averaged (smoothed) and consequently blurred. That is, the filter processing using the filter coefficient matrix 610 has an issue that an edge in a resultant image is blurred compared to an original image.

In the second exemplary embodiment, filter processing that is effective not only for a horizontal line edge but also for a vertical line edge.

In the second exemplary embodiment, a filter coefficient matrix 611 illustrated in FIG. 6 is used. The 1×5 filter coefficient matrix 611 includes filter coefficients to be applied to pixels around a pixel 631 as a target pixel. The filter coefficient matrix 611 is obtained by convolutionally applying an edge enhancement filter matrix 612 to the filter coefficient matrix 610. In this application, values to be applied to the both ends of the filter coefficient matrix 611 are set to 0.

A result obtained by performing filter processing using the filter coefficient matrix 611 on the image data 600 that contains the horizontal line edge is the image data 601.

A result obtained by performing the filter processing using the filter coefficient matrix 611 on the image data 600 that contains the vertical line edge is image data 604.

Through this filter processing, similar to the image data 601 in which unevenness at the horizontal line edge is improved, the image data 604 maintains the vertical line edge having almost the same level of sharpness as that of the original image. In other words, in the image data 604 generated using the filter coefficient matrix 611, the issue at the vertical line edge has been resolved compared to the image data 603 generated using the filter coefficient matrix 610 in the first exemplary embodiment. This filter processing utilizes the difference between a frequency characteristic of the unevenness occurring in three-pixel cycles, which is about 8 lines/mm, and a frequency characteristic of the edge portion of an object such as a character or a line, which is about 3 to 5 lines/mm, in a read image of 600 dpi. In general, a document used as an original document has a frequency characteristic of about 3 to 5 lines/mm in most cases. For example, in the case of a kanji (or Chinese) character for "den (electricity)" in a Microsoft Ming font, which has a relatively high frequency among other characters in other fonts, the character in a 5-point Microsoft Ming font, that is in size close to the limit of readability, includes seven horizontal lines in a range of about 1.4 mm between the uppermost line and the lowermost line of the character, thus having a frequency characteristic of about 5 lines/mm. In reality, however, those characters that are larger than 5-point characters and have relatively low frequency components are used in most cases. Therefore, the frequency of an object such as a character or a line falls within 3 to 5 lines/mm while varying depending on the degree of blurring at edge portions.

As described above, in the present exemplary embodiment, filter processing is performed on read image data using the filter coefficient matrix 611 for smoothing unevenness due to deterioration in image quality using the elements of an averaging filter and for maintaining sharpness of edge components using an edge enhancement filter. The characteristic of the filter coefficient matrix 611 enables not only the unevenness to be improved in a horizontal line edge but also the sharpness of a vertical line edge to be maintained at almost the same level as in an original image.

A third exemplary embodiment will be described below. The present exemplary embodiment will be described using a configuration in which a color image of 600 dpi is generated using a sensor (for example, the sensor 300 illustrated in FIG. 3) in which photosensitive elements having different spectral characteristics are arrayed in a specific pattern.

In a case where a color image is read, the apparatus configuration of an image reader and a flowchart indicating the operation of the image reader are the same as those for reading a gray scale image in the first and the second exemplary embodiments. A difference from the first and the second exemplary embodiments is that, as described below, image reading and filter processing are for each color of red, green, and blue, not for a single color. Detailed description is given below with reference to FIGS. 2A, 2B, and 7.

In the third exemplary embodiment, in step S201 in FIG. 2A, the reading unit 101 reads an original document to generate full-color (red, green, and blue) image data and stores the generated image data in the storage unit 120 under the control of the main control unit 110. Specifically, red image data, green image data, and blue image data are stored in the storage unit 120.

Figure 7:
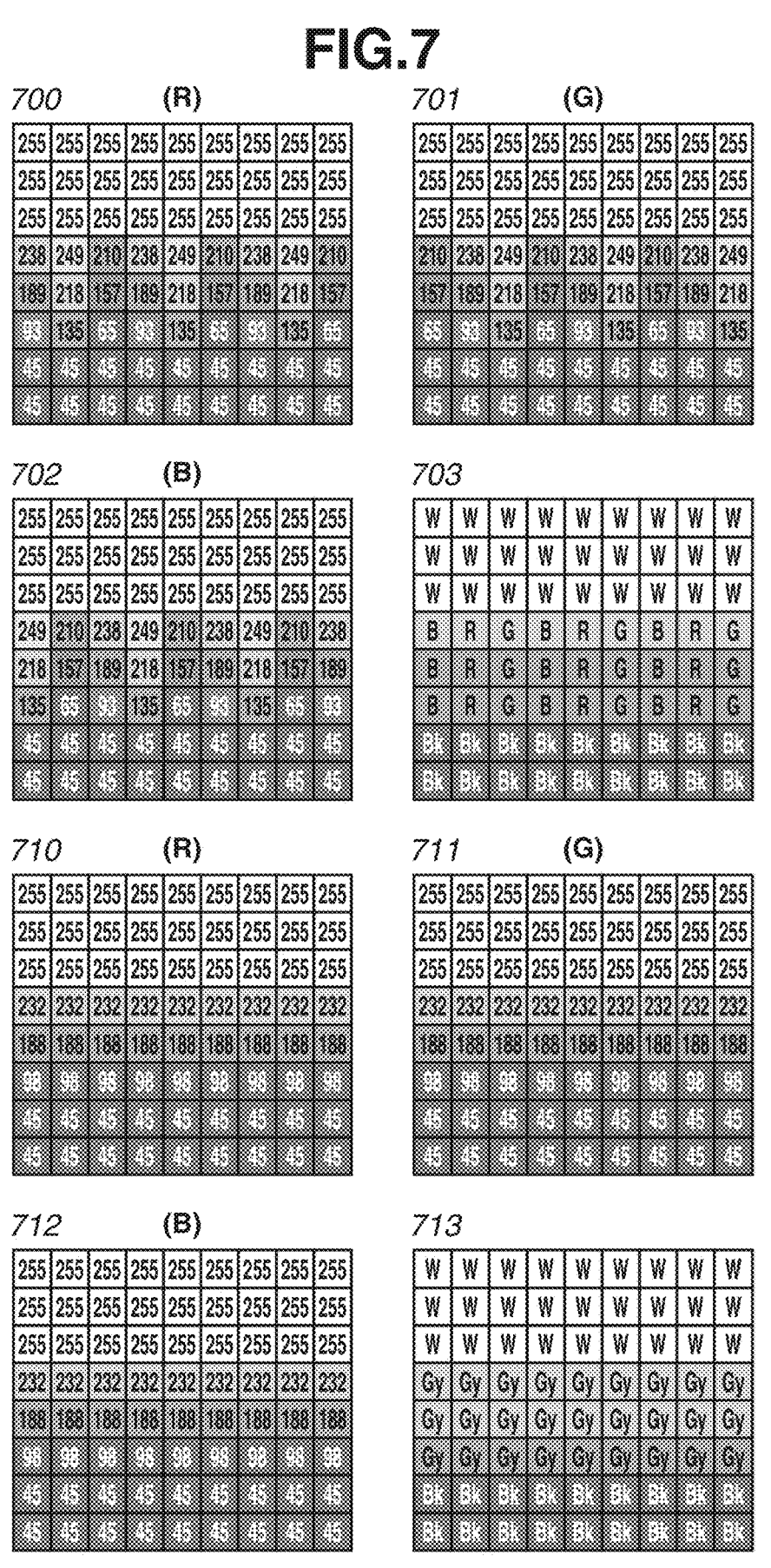

FIG. 7 illustrates an image in which a color shift has occurred and effects of filter processing according to the third exemplary embodiment.

In FIG. 7, pieces of image data 700, 701, and 702 are red image data, green image data, and blue image data, respectively, generated by reading the original document 410 in the first exemplary embodiment, i.e., an image containing a black object on a white background.

The image data 701 indicates luminance signals read by the green photosensitive elements and is accordingly the same as the image data 600 illustrated in FIG. 6.

The image data 700 indicates luminance signals read by the red photosensitive elements. The image data 702 indicates luminance signals read by the blue photosensitive elements. The pieces of image data 700 and 702 are acquired under the conditions same as those when the image data 701 is acquired, except that the arrays of the photosensitive elements differ in phase. Accordingly, the image data 700 and 702 correspond to images obtained by shifting the phase of the image data 600. That is, in all of the image data 700 to 702, the same unevenness (deterioration in image quality) has occurred in phases respectively different by the colors.

The image data 703 schematically represents color image data obtained by combining the image data 700 (red), 701 (green), and 702 (blue).

In the image data 703, "W" indicates a white pixel, and "Bk" indicates a black pixel. "R" indicates a pixel that is slightly more reddish than a pure gray color, "G" a pixel that is slightly more greenish than the pure gray color, and "B" a pixel that is slightly more bluish than the pure gray color.

The red luminance signals, the green luminance signals, and the blue luminance signals in the image data 703 are acquired in respectively different phases, so that the blue, red, and green images are colored in this order in three-pixel cycles. In other words, a color shift has occurred in an edge area located at the boundary between the black object and the white background in the image data 703.

The description returns to the flowchart in FIG. 2A.

Upon completion of the processing in step S201, the processing proceeds to step S202.

In the third exemplary embodiment, in step S202, the filter processing unit 102 performs convolutional filter processing on each of the pieces of image data acquired using the respective kinds (red, green, and blue) of photosensitive elements under the control of the main control unit 110.

Specifically, the filter processing unit 102 performs filter processing on the red image data 700, the green image data 701, and the blue image data 702 individually under the control of the main control unit 110. Results obtained by performing the filter processing on the image data 700, 701, and 702 using the filter coefficient matrix 611 in FIG. 6 are image data 710, 711, and 712, respectively. The evenness in the edge areas is improved by the effect of the filter processing as in the first exemplary embodiment.

Color image data obtained by combining the pieces of image data 710 (red), 711 (green), and 712 (blue) is schematically represented as image data 713. In the image data 713, "W", "Bk", and "Gy" indicate a white pixel, a black pixel, and a gray pixel, respectively. The luminance signal values in the respective pixels are the same among the red image data 710, the green image data 711, and the blue image data 712, so that the edge area is all expressed by gray pixels in the image data 713. That is, the color shift has been improved.

Upon completion of the processing in step S202, the main control unit 110 ends the processing in FIG. 2A.

The operation in the present exemplary embodiment has been described above.

As described above, a color shift that occurs in three-pixel cycles can be improved by performing filter processing according to the present exemplary embodiment. As in the first exemplary embodiment described above, the cycle depends on the array pattern of the photosensitive elements, so that the cycle is not limited to the three-pixel cycle. Thus, even when the cycles have a length of two pixels or four or more pixels, the same effect can be obtained by averaging based on the number of pixels in each cycle.

According to each of the exemplary embodiments described above, the image quality of image data read by scanning by a sensor in which photosensitive elements having different spectral characteristics are arrayed in a specific pattern can be improved by a simple configuration. In particular, deterioration in image quality in an edge portion of the image data can be prevented. As a result, erroneous ACS determination can be also prevented.

Each of the exemplary embodiments described above has been described using, as an example, the image processing apparatus 100 that includes the reading unit 101 and the filter processing unit 102 as illustrated in FIG. 1. Another configuration may be employed in which the filter processing in FIG. 2B is performed by an information processing apparatus (for example, a personal computer (PC)) that includes the filter processing unit 102 and is capable of receiving image data generated by reading an original document by an image reader (scanner) that includes the reading unit 101, in this case, a scanner driver (scanner driver that controls the scanner that includes the reading unit 101) installed in the PC may have the function of the filter processing unit 102. Furthermore, another configuration may be employed in which image data generated by the scanner that includes the reading unit 101 is temporally stored in a storage device accessible by the PC, and the image data is processed by the filter processing unit 102 included in the PC.

The same effect as in the above exemplary embodiments can be produced in a case where any of these alternative configuration is employed.

In conventional techniques, there is an issue that, when reading an image using a sensor having a specific array pattern, the image quality thereof is deteriorated as a result of the occurrence of cyclic unevenness (irregularities) and a color shift. In association with this issue, there arises another issue that correct ACS determination may not be achieved in the conventional techniques. According to the present exemplary embodiments, these issues can be solved by performing filter processing on a read image to average a target pixels and neighboring pixels around the target pixel in a direction vertical to the scanning direction of the sensor.

The various data described above are not limited to the configurations and the content thereof described above and may have different configurations and content in accordance with applications and purposes thereof.

While exemplary embodiments of the present disclosure have been described above, the aspects of the present disclosure may be embodied in the form of such as a system, an apparatus, a method, a computer program, or a storage medium. Specifically, the aspects of the present disclosure may be embodied in the form of a system including a plurality of devices or may be embodied in the form of an apparatus including a single device.

Furthermore, any combination of the above exemplary embodiments shall be construed as being included in the scope of the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-197086, filed Oct. 19, 2018, which is hereby incorporated by reference herein in its entirety.

What is claimed is:

1. An image processing apparatus comprising:
a scanner that scans a document in a first direction, using one of a plurality of types of reading elements that have different spectral sensitivity characteristics and are cyclically arrayed in a second direction vertical to the first direction; and
at least one processor or at least one circuit that performs, on image data generated by scanning the document by the scanner, at least filter processing for averaging pixel values of pixels equal in number to the types of the reading elements in the second direction.

2. The image processing apparatus according to claim 1, wherein the at least one processor or the at least one circuit further performs, on the image data, filter processing for enhancing an edge in the second direction.

3. The image processing apparatus according to claim 1, wherein the at least one processor or the at least one circuit performs the filter processing on each of respective pieces of image data generated using the plurality of types of reading elements.

4. The image processing apparatus according to claim 1, wherein the plurality of types of reading elements are three types of reading elements: red, green, and blue reading elements.

5. The image processing apparatus according to claim 1, wherein the one of the plurality of types of reading elements is a green reading element.

6. A control method for controlling an image processing apparatus, the control method comprising:
scanning a document in a first direction, using one of a plurality of types of reading elements that have different spectral sensitivity characteristics and are cyclically arrayed in a second direction vertical to the first direction;
generating image data by scanning the document; and
performing, on the generated image data, at least filter processing for averaging pixel values of pixels equal in number to the types of the reading elements in the second direction.

7. A non-transitory computer-readable storage medium having a computer program stored therein that causes a computer to execute a control method for controlling an image processing apparatus, the control method comprising:
scanning a document in a first direction, using one of a plurality of types of reading elements that have different spectral sensitivity characteristics and are cyclically arrayed in a second direction vertical to the first direction;
generating image data by scanning the document; and
performing, on the generated image data, at least filter processing for averaging pixel values of pixels equal in number to the types of the reading elements in the second direction.

* * * * *